(12) United States Patent
Koo et al.

(10) Patent No.: US 9,854,521 B2
(45) Date of Patent: Dec. 26, 2017

(54) APPARATUS AND METHOD FOR CANCELLING INTERFERENCE IN COMMUNICATION SYSTEM SUPPORTING MULTI-USER MULTIPLE-INPUT MULTIPLE-OUTPUT SCHEME

(71) Applicants: Samsung Electronics Co., Ltd., Gyeonggi-do (KR); Industry-Academic Cooperation Foundation, Yonsei-University, Seoul (KR)

(72) Inventors: Ji-Hun Koo, Gyeonggi-do (KR); Min-Joon Kim, Seoul (KR); Jang-Yong Park, Seoul (KR); Hyuk-Yeon Lee, Gangwon-do (KR); Jae-Seok Kim, Seoul (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 201 days.

(21) Appl. No.: 14/713,731

(22) Filed: May 15, 2015

(65) Prior Publication Data

US 2016/0087702 A1 Mar. 24, 2016

(30) Foreign Application Priority Data

Sep. 19, 2014 (KR) .......................... 10-2014-0125253

(51) Int. Cl.
*H04W 52/02* (2009.01)
*H04B 7/0452* (2017.01)
(Continued)

(52) U.S. Cl.
CPC ...... *H04W 52/0219* (2013.01); *H04B 7/0452* (2013.01); *H04B 7/0465* (2013.01);
(Continued)

(58) Field of Classification Search
CPC H04B 7/0465; H04B 7/0452; H04W 52/0219
See application file for complete search history.

(56) References Cited

U.S. PATENT DOCUMENTS

| 8,891,677 B2* | 11/2014 | Yue | ........................ H04L 1/1819 375/267 |
| 2010/0248729 A1* | 9/2010 | Yu | ......................... H04B 7/026 455/450 |

(Continued)

FOREIGN PATENT DOCUMENTS

| KR | 10-2010-0079216 | 7/2010 |
| KR | 10-2010-0085884 | 7/2010 |

OTHER PUBLICATIONS

Larsen et al. MIMO SVD-Based Multiplexing with Imperfect Channel Knowledge, IEEE International Conference on Acoustics Speech and Signal Processing (ICASSP) 978-1-4244-4296-6, Mar. 14-19, 2010 (p. 3454-3457).*

(Continued)

*Primary Examiner* — Michael Thier
*Assistant Examiner* — Brian Cox
(74) *Attorney, Agent, or Firm* — The Farrell Law Firm, P.C.

(57) ABSTRACT

A method of canceling interference by a signal receiving apparatus in a communication system supporting a multi-user Multiple-Input Multiple-Output (MIMO) scheme and a signal receiving apparatus is provided. The method includes determining whether there is a need for using an interference cancellation scheme while performing a signal detecting operation; and performing the signal detecting operation using the interference cancellation scheme, or performing the signal detecting operation without using the interference cancellation scheme based on determining whether there is the need for using the interference cancellation scheme.

10 Claims, 9 Drawing Sheets

(51) Int. Cl.
H04B 7/04 (2017.01)
H04J 11/00 (2006.01)
(52) U.S. Cl.
CPC ..... *H04J 11/0023* (2013.01); *H04W 52/0238* (2013.01); *H04W 52/0274* (2013.01); *Y02B 60/50* (2013.01)

(56) References Cited

U.S. PATENT DOCUMENTS

2010/0266056 A1 10/2010 Lee et al.
2014/0307569 A1* 10/2014 Barbieri ............... H04L 5/0032
370/252

OTHER PUBLICATIONS

Jungwon Lee et al., Interference Mitigation via Joint Detection, IEEE Journal on Selected Areas in Communications vol. 29, No. 6, Jun. 2011.
Jack H. Winters, Optimum Combining in Digital Mobile Radio with Cochannel Interference, IEEE Journal on Selected Areas in Communications, vol. SAC-2, No. 4, Jul. 1984.
Minjoon Kim et al., Efficient Near-Optimal Detection for Blind MU-MIMO Using Generalized Sphere Decoder, ETRI Journal.

* cited by examiner

APPARATUS AND METHOD FOR CANCELLING INTERFERENCE IN COMMUNICATION SYSTEM SUPPORTING MULTI-USER MULTIPLE-INPUT MULTIPLE-OUTPUT SCHEME

PRIORITY

This application claims priority under 35 U.S.C. §119(a) to a Korean Patent Application filed on Sep. 19, 2014 in the Korean Intellectual Property Office and assigned Serial No. 10-2014-0125253, the entire contents of which are incorporated herein by reference.

BACKGROUND

1. Field of the Disclosure

The present disclosure relates to an apparatus and method for canceling interference in a communication system supporting a multi-user Multiple-Input Multiple-Output (MIMO) scheme, and more particularly, disclosure to an apparatus and method for adaptively canceling interference in a communication system supporting a multi-user MIMO scheme.

2. Description of the Related Art

Communication systems have evolved to support high data rates in order to satisfy demands for wireless data traffic, which continuously increases. For example, a communication system has evolved to enhance spectral efficiency and increase channel capacity based on various schemes such as a MIMO scheme, and the like in order to increase a data rate.

In a communication system, cell edge STAtions (STAs) which are located at a cell edge region which is far from a cell center in which a Signal-to-Noise Ratio (SNR) is low, or a Carrier-to-Interference and Noise Ratio (CINR) is low due to significant impact of interference from a Base Station (BS), which is located at a neighbor cell, may decrease system performance of the communication system.

Thus, in a communication system, various schemes such as an Inter-Cell Interference-Coordination (ICIC) scheme, a Coordinated Multi-Points (CoMP) scheme, an interference cancellation scheme, and the like have been developed in order to increase transmission efficiency for the cell edge STAs.

In a downlink in a communication system supporting a multi-user MIMO scheme, an Access Point (AP) may transmit data to a plurality of STAs. So, if the AP provides a service to the plurality of STAs, the AP may provide high throughput.

In the downlink in a communication system supporting the multi-user MIMO scheme, the AP applies a pre-coding matrix which is generated based on downlink Channel State Information (CSI) feedback to a transmitted signal.

Meanwhile, a downlink in a communication system supporting a multi-user MIMO scheme has been modeled by assuming that only a desired signal is received in an STA, since a perfect pre-coding is applied to a transmitted signal. However, in an actual channel situation of the downlink in a communication system supporting the multi-user MIMO scheme, there are a quantization error and a channel estimation error, so it is difficult that a perfect pre-coding is applied to the transmitted signal due to the quantization error and the channel estimation error.

If a pre-coding matrix which is generated based on CSI in which an error is included is applied to a transmitted signal, information necessary for each STA, e.g., a desired signal and unnecessary information which is for other STAs, e.g., interference signals are received in each STA. These interference signals result in a decreased receiving rate in each STA.

Thus, in a communication system supporting the multi-user MIMO scheme, various interference cancellation schemes have been proposed in order to solve situations which may occur due to interference signals.

However, the various interference cancellation schemes proposed in a communication system supporting the multi-user MIMO scheme have high processing complexity, and are inefficient since an interference cancellation operation must always be performed even though an interference signal does not influence detection of a desired signal. The various interference cancellation schemes require a large amount of processing computation and power, since an interference cancellation operation is always performed even though an interference signal does not influence detection of a desired signal.

Thus, there is a need for a new scheme of canceling interference thereby decreasing processing complexity, processing computation amount, and power consumption in a communication system supporting a multi-user MIMO scheme.

SUMMARY

The present disclosure has been made to address at least the above-mentioned problems and/or disadvantages and to provide at least the advantages described below. Accordingly, an aspect of the present disclosure is to provide an apparatus and method for canceling interference in a communication system supporting a multi-user MIMO scheme.

In accordance with an aspect of the present disclosure, a method of canceling interference by a signal receiving apparatus in a communication system supporting a multi-user MIMO scheme is provided. The method includes determining whether there is a need for using an interference cancellation scheme while performing a signal detecting operation; and performing the signal detecting operation using the interference cancellation scheme, or performing the signal detecting operation without using the interference cancellation scheme based on determining whether there is the need for using the interference cancellation scheme.

In accordance with another aspect of the present disclosure, a method of canceling interference by a signal receiving apparatus in a communication system supporting a multi-user MIMO scheme is provided. The method includes determining whether there is a need for adjusting an interference cancellation number used in an interference cancellation scheme while performing a signal detecting operation; and performing the signal detecting operation by adjusting the interference cancellation number, or performing the signal detecting operation without adjusting the interference cancellation number based on determining whether there is the need for adjusting the interference cancellation number.

In accordance with another aspect of the present disclosure, a signal receiving apparatus in a communication system supporting a multi-user MIMO scheme is provided. The signal receiving apparatus includes a controller configured to determine whether there is a need for using an interference cancellation scheme while performing a signal detecting operation; and a receiver configured to perform the signal detecting operation using the interference cancellation scheme or perform the signal detecting operation without using the interference cancellation scheme based on the controller determining whether there is the need for using the interference cancellation scheme.

In accordance with another aspect of the present disclosure, a signal receiving apparatus in a communication system supporting a multi-user MIMO scheme is provided. The signal receiving apparatus includes a controller configured to determine whether there is a need for adjusting an interference cancellation number used in an interference cancellation scheme while performing a signal detecting operation; and a receiver configured to perform the signal detecting operation by adjusting the interference cancellation number or perform the signal detecting operation without adjusting the interference cancellation number based on the controller determining whether there is the need for adjusting the interference cancellation number.

BRIEF DESCRIPTION OF THE DRAWINGS

The above and other aspects, features and advantages of embodiments of the present disclosure will be more apparent from the following description, taken in conjunction with the accompanying drawings, in which.

DETAILED DESCRIPTION

Figure 1:
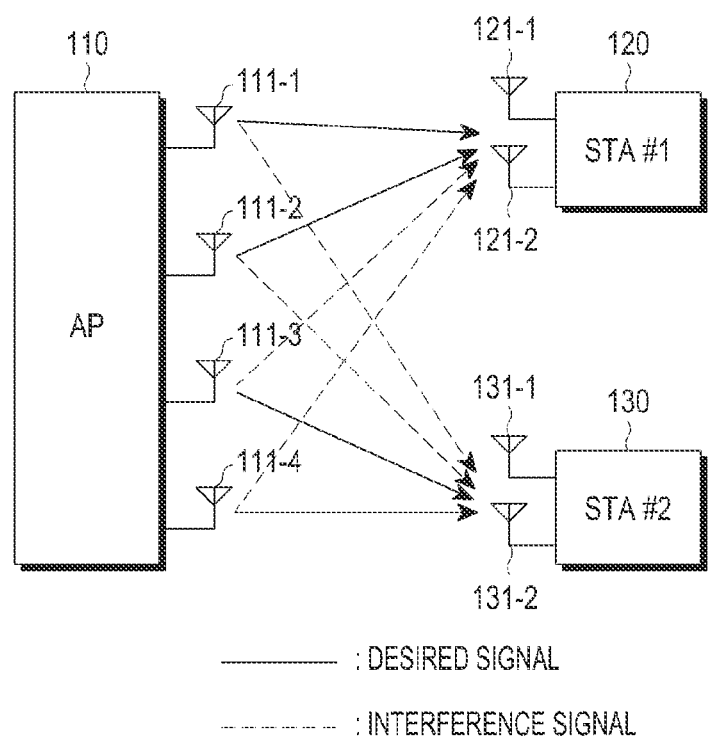
FIG. 1 is a schematic diagram of a multi-user MIMO communication system according to an embodiment of the present disclosure.

The following description with reference to the accompanying drawings is provided to assist in a comprehensive understanding of various embodiments of the present disclosure as defined by the appended claims and their equivalents. It includes various details to assist in that understanding but these are to be regarded as mere examples. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness. Throughout the drawings, it should be noted that like reference numbers are used to depict the same or similar elements, features, and structures.

The terms and words used in the following description and claims are not limited to their dictionary meanings, but, are merely used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

The terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments of the present disclosure only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), a Moving Picture Experts Group Audio Layer 3 (MP3) player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio device, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, a Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a STAtion (STA) may be an electronic device.

According to various embodiments of the present disclosure, for example, an STA operates as a signal receiving apparatus, and an Access Point (AP) operates as a signal transmitting apparatus.

An embodiment of the present disclosure proposes an apparatus and method for canceling interference in a communication system supporting a multi-user Multiple-Input Multiple-Output (MIMO) scheme.

An embodiment of the present disclosure proposes an apparatus and method for adaptively canceling interference in a communication system supporting a multi-user MIMO scheme.

An embodiment of the present disclosure proposes an apparatus and method for adaptively canceling interference based on an error prediction scheme in a communication system supporting a multi-user MIMO scheme.

An embodiment of the present disclosure proposes an apparatus and method for canceling interference thereby decreasing processing complexity in a communication system supporting a multi-user MIMO scheme.

An embodiment of the present disclosure proposes an apparatus and method for canceling interference thereby decreasing processing computation amount in a communication system supporting a multi-user MIMO scheme.

An embodiment of the present disclosure proposes an apparatus and method for canceling interference thereby decreasing power consumption in a communication system supporting a multi-user MIMO scheme.

A method and apparatus proposed in an embodiment of the present disclosure may be applied to various communication systems such as an Institute of Electrical and Electronics Engineers (IEEE) 802.11ac communication system, an IEEE 802.16 communication system, a digital video broadcasting system such as a mobile broadcasting service such as a Digital Multimedia Broadcasting (DMB) service, a Digital Video Broadcasting-Handheld (DVP-H) service, an Advanced Television Systems Committee-Mobile/Handheld (ATSC-M/H) service, and the like, and an Internet Protocol TeleVision (IPTV) service, a Moving Picture Experts Group (MPEG) Media Transport (MMT) system, an Evolved Packet System (EPS), a Long Term Evolution (LTE) mobile communication system, an LTE-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system proposed in a $3^{rd}$ Generation Partnership Project 2 (3GPP2), a Wideband Code Division Multiple Access (WCDMA) mobile communication system proposed in the 3GPP2, a Code Division Multiple Access (CDMA) mobile communication system proposed in the 3GPP2, an Institute of Electrical and Electronics Engineers (IEEE) mobile communication system, a Mobile Internet Protocol (Mobile IP) system, and/or the like.

A structure of a communication system supporting a multi-user MIMO scheme according to an embodiment of the present disclosure will be described with reference to FIG. 1.

For convenience, a communication system supporting a multi-user MIMO scheme is called multi-user MIMO communication system.

FIG. 1 is a schematic diagram of a multi-user MIMO communication system according to an embodiment of the present disclosure.

Referring to FIG. 1, the multi-user MIMO communication system includes an Access Point (AP) 110, and a plurality of STAs, e.g., two STAs, i.e., an STA #1 120, and an STA #2 130.

The AP 110 includes a plurality of antennas, e.g., four antennas, i.e., an antenna #1 111-1, an antenna #2 111-2, an antenna #3 111-3, and an antenna #4 111-4.

Each of the STA #1 120 and the STA #2 130 includes a plurality of antennas, e.g., two antennas. That is, the STA #1

120 includes an antenna #1 121-1, and an antenna #2 121-2, and the STA #2 130 includes an antenna #1 131-1, and an antenna #2 131-2.

In a multi-user MIMO communication system in FIG. 1, it will be assumed that there is an interference signal due to a Channel State Information (CSI) feedback error.

In a case where a received signal vector which the ith STA among $N_{user}$ STAs receives is $Y_i$, a channel for the ith STA is $H_i$, a transmitted symbol vector is X, a pre-coding matrix including a CSI feedback error and a channel estimation error is V, and a Gaussian noise for the ith STA is $N_i$, the multi-user MIMO communication system may be modeled as Equation (1).

$$Y_i = H_i \hat{V} X + N_i \quad \text{Equation (1)}$$

Where, $\hat{V}$ denotes an estimated pre-coding matrix.

The received signal vector $V_i$ in Equation (1) may be classified into a desired signal component and an interference signal component, thus Equation (1) may be expressed as Equation (2) where the desired signal component and the interference signal component are classified.

$$Y_i = \underbrace{H_i \hat{V}_i X_i}_{\text{Desired Signal}} + \underbrace{\sum_{j=1, j \neq i}^{N_{user}} H_i \hat{V}_j X_j + N_i}_{\text{Interference Signal}} \quad \text{Equation (2)}$$

$$= \underbrace{\tilde{H}_i X_i}_{\text{Desired Signal}} + \underbrace{\sum_{j=1, j \neq i}^{N_{user}} \tilde{H}_j X_j + N_i}_{\text{Interference Signal}}$$

$X_i$ denotes a transmitted symbol vector for the ith STA, and j denotes the number of STAs at which occur an interference signal for the ith STA on the ith STA basis, i.e., $N_{user}-1$. In this case, i denotes an STA where the ith symbol vector is a desired signal. On the ith STA basis, signals for other STAs become interference signal components except for the ith desired signal component which is necessary for the ith STA.

In Equation (2), $H_i \hat{V}_i X_i$ denotes a desired signal component, and $$\sum_{j=1, j \neq i}^{N_{user}} H_i \hat{V}_j X_j$$

denotes an interference signal component. In Equation (2), $\tilde{H}_i$ denotes $H_i \hat{V}_i$, the desired signal component $H_i \hat{V}_i X_i$ may be expressed as $\tilde{H}_i X_i$, and the interference signal component $$\sum_{j=1, j \neq i}^{N_{user}} H_i \hat{V}_j X_j$$

may be expressed as $$\sum_{j=1, j \neq i}^{N_{user}} \tilde{H}_j X_j.$$

If a Maximum Likelihood (ML) detection scheme which considers only a desired signal is applied to the received signal vector $Y_i$ in Equation (2), a desired signal for the ith STA, i.e., a transmitted symbol vector $X_{i, ML}$ may be expressed as Equation (3).

$$X_{i,ML} = \operatorname*{argmin}_{X_i \in |\Omega|^{N_{RX,i}}} \left\| Y_i - \tilde{H}_i X_i \right\|^2. \quad \text{Equation (3)}$$

$N_{RX,i}$ denotes the number of antennas which the ith STA includes, and $|\Omega|^{N_{RX}}$ denotes symbol candidate vectors which are possible to receive via $N_{RX,i}$ receiving antennas, i.e., all possible $\Omega^{N_{RX}}$ symbol combinations. If an STA uses a sixteen-phase Quadrature Amplitude Modulation (16QAM) scheme, and the number of receiving antennas which the STA uses is 4, $|\Omega|^{N_{RX}}$ denotes $16^4$ (=65536) symbol combinations. Further, $\Omega$ denotes a symbol constellation which is currently used in a multi-user MIMO communication system. If an STA uses a 16QAM scheme, $\Omega \in \{-3-3i, -3-1i, -3+1i, \ldots, 3+1i, 3+3i\}$.

In the ML detection scheme which considers only the desired signal as in Equation (3), a signal receiving apparatus, i.e., the ith STA performs a signal detecting operation by only considering the desired signal, so performance degradation may occur due to an interference signal.

In order to solve the performance degradation due to the interference signal, a Joint Maximum Likelihood (JML) detection scheme where both a desired signal and an interference signal are considered has been proposed, the JML detection scheme may be expressed as Equation (4).

$$X_{i,JML} = \operatorname*{argmin}_{X_i} \left[ \min_{\substack{X_1, \ldots, X_{i-1}, \\ X_{i-1}, \ldots, X_{N_{user}}}} \left\| Y_i - \tilde{H}_i X_i - \sum_{j=1, j \neq i}^{N_{user}} \tilde{H}_j X_j \right\|^2 \right] \quad \text{Equation (4)}$$

Where, $X_{i,JML}$ denotes a desired signal for the ith STA, i.e., a transmitted symbol vector in a case where the JML detection scheme where both the desired signal and the interference signal are considered is applied to the received signal vector $Y_i$.

As expressed as Equation (4), if the JML detection scheme is used, the ith STA detects the desired signal by considering both the desired signal and the interference signal. If the JML detection scheme is used, signal detection performance may be enhanced compared to the ML detection scheme.

However, if the JML detection scheme is used, a signal receiving apparatus detects a signal by considering both the desired signal and the interference signal, so the signal receiving apparatus has relatively high processing complexity and requires a relatively large amount of processing computation as compared to the ML detection scheme where only the desired signal is considered. The relatively large processing computation amount increases power consumption of the signal receiving apparatus.

An embodiment of the present disclosure proposes an Adaptive Interference Cancellation (AIC) scheme where an interference cancellation operation is performed only if an interference signal affects detection of a transmitted signal, as described below.

The AIC scheme includes a process of determining whether to use an interference cancellation scheme, e.g., a JML detection scheme based on the first error prediction scheme, where the first error prediction scheme may be implemented with various forms, as described below, thus a detailed description is omitted herein.

A process of performing a signal detecting operation based on an AIC scheme in a signal receiving apparatus in a multi-user MIMO communication system according to an embodiment of the present disclosure is described with reference to FIG. 2.

Figure 2:
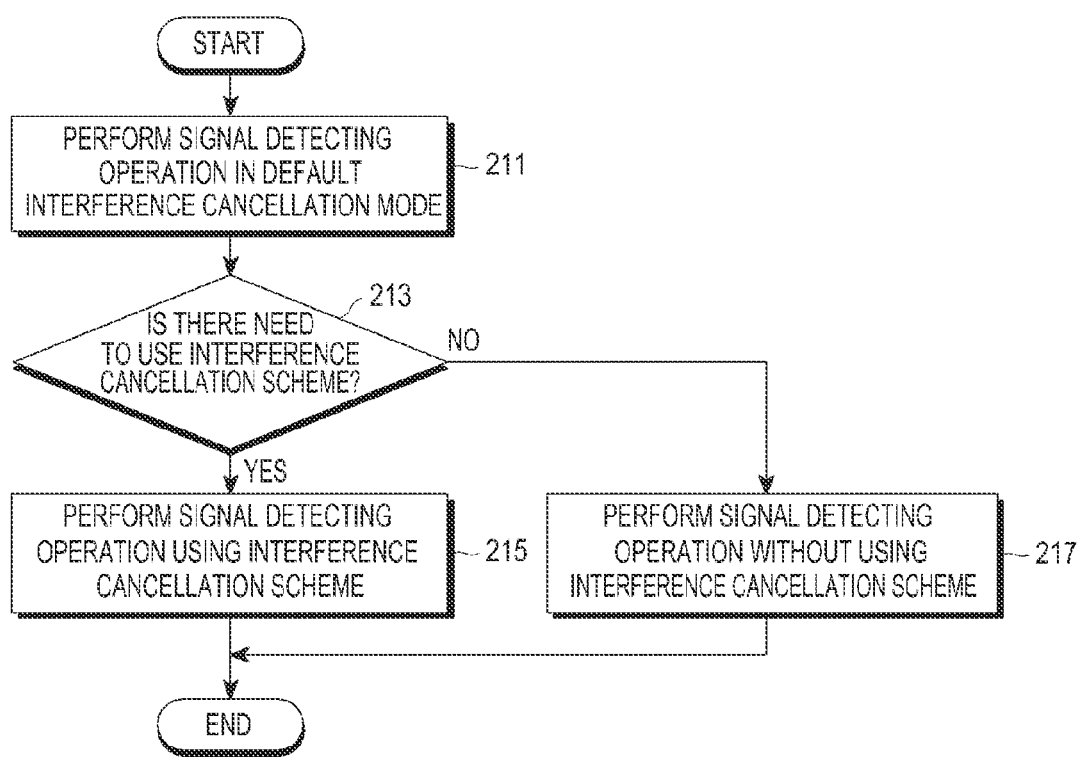
FIG. 2 is a flowchart of a signal detecting method based on an Adaptive Interference Cancellation (AIC) scheme in a signal receiving apparatus in a multi-user MIMO communication system according to an embodiment of the present disclosure.

FIG. 2 is a flowchart of a signal detecting method based on an AIC scheme in a signal receiving apparatus in a multi-user MIMO communication system according to an embodiment of the present disclosure.

Referring to FIG. 2, the signal receiving apparatus performs a signal detecting operation in an interference cancellation mode that is set as a default in step 211. A default interference cancellation mode as the interference cancellation mode that is set as the default may be set to an interference cancellation mode, e.g., one of a normal mode where a JML detection scheme is not used, and a JML detection mode where the JML detection scheme is used, where the default interference cancellation mode may be set according to a need of the multi-user MIMO communication system.

While performing the signal detecting operation in the default interference cancellation mode, the signal receiving apparatus determines whether there is a need to use the interference cancellation scheme, i.e., the JML detection scheme in step 213. The signal receiving apparatus may determine whether there is the need of using the JML detection scheme based on the first error prediction scheme, as described below.

The first error prediction scheme may be performed based on an error prediction scheme which is based on a channel matrix for a transmitted signal, a channel matrix for an interference signal, and covariance of noise as in Equation (5).

$$\|Y_i - \tilde{H}_i X_i\|^2 < \|Y_i - \tilde{H}_i \hat{X}_i\|^2 \quad \text{Equation (5)}$$

$X_i \neq \hat{X}_i$. Equation (5) is a case where an error of a transmitted symbol vector $X_i$ which is detected without considering an interference signal is less than an error of a transmitted symbol vector $X_i$ which is detected by considering the interference signal. That is, the error prediction scheme criterion in Equation (5) indicates that the transmitted symbol vector $X_i$ which is detected without considering the interference signal is more accurate than the transmitted symbol vector $X_i$ which is detected by considering the interference signal if the error prediction scheme criterion is satisfied.

If the first error prediction scheme is used, and the error prediction criterion of Equation (5) is satisfied, the signal receiving apparatus determines that there is no need for using the JML diction scheme, thus the signal receiving apparatus may detect a transmitted signal thereby decreasing processing complexity and processing computation amount. That is, even though the signal receiving apparatus performs a signal detecting operation without considering an interference signal, the signal receiving apparatus may accurately detect a signal compared to a case where the signal receiving apparatus performs the signal detecting operation by considering the interference signal. Thus, the signal receiving apparatus determines not to use the JML detection scheme.

If the error prediction scheme criterion of Equation (5) is not satisfied, that is, the error of the transmitted symbol vector $X_i$ which is detected without considering the interference signal is greater than or equal to the error of the transmitted symbol vector $X_i$ which is detected by considering the interference signal, it indicates that the transmitted symbol vector $X_i$ which is detected without considering the interference signal is not more accurate than the transmitted symbol vector $X_i$ which is detected by considering the interference signal, so the signal receiving apparatus determines that it is necessary to use the JML detection scheme based on the first error prediction scheme.

In a case where the error prediction scheme criterion of Equation (5) is not satisfied, if the signal receiving apparatus detects a transmitted signal without canceling interference, there is a high probability that an error occurs in a detected transmitted signal, so the signal receiving apparatus detects the transmitted signal by performing an interference cancellation operation using the JML detection scheme thereby increasing reliability of the transmitted signal.

As described above, Equation (5) indicates an error predication scheme criterion for a signal receiving apparatus to accurately detect a transmitted signal in a situation where there are interference signals of multiple users. That is, in Equation (5), the signal receiving apparatus may detect the transmitted signal without error only if the strength of an interference signal does not affect detection of the transmitted signal.

Meanwhile, Equation (5) may be expressed as Equation (6).

$$\min_{\substack{\hat{X}_i \in \Omega^{N_{Rx,i}}, \\ \hat{X}_i \neq X_i}} \frac{\|\tilde{H}_i(X_i - \hat{X}_i)\|^2}{4} \leq \left\| \sum_{j=1, j\neq i}^{N_{user}} \tilde{H}_j X_j + N_i \right\| \quad \text{Equation (6)}$$

If an error prediction scheme criterion of Equation (6) is satisfied, a signal receiving apparatus detects a transmitted signal using a JML detection scheme. If the error prediction scheme criterion of Equation (6) is not satisfied, the signal receiving apparatus detects the transmitted signal without using the JML detection scheme.

Equation (6) denotes an error prediction scheme criterion where the signal receiving apparatus may not detect the transmitted signal in which there is always no error without considering an interference signal. That is, if the error prediction scheme criterion of Equation (6) is satisfied, the interference signal affects detection of the transmitted signal, thus an error is always included in the transmitted signal which is detected in the signal receiving apparatus.

If the error prediction scheme criterion of Equation (6) is satisfied, the signal receiving apparatus detects the transmitted signal using the JML detection scheme thereby accurately detecting the transmitted signal without being affected by the interference signal.

The error prediction scheme criterion of Equation (6) includes a noise component which the signal receiving apparatus maybe unaware of, and transmitted symbol information which a signal transmitting apparatus transmits, thus it may be difficult for the signal receiving apparatus to use the first error prediction scheme which is based on Equation (6) in an actual channel environment.

Thus, if a upper bound and a lower bound are applied to both sides of Equation (6) respectively, Equation (6) is converted to Equation (7).

$$\frac{\lambda_{min} d_{min}}{2} < C \sum_{j=1, j\neq i}^{N_{user}} \sum_{l}^{N_{RX,j}} \|h_{j,l}\| + \sigma \sqrt{N_{RX,i}} \quad \text{Equation (7)}$$

In Equation (7), $\lambda_{min}$ denotes a minimum value of a diagonal matrix element if a Singular Value Decomposition (SVD) computation is applied to $\tilde{H}_i$. The reason why the SVD computation is applied to $\tilde{H}_i$ is for detecting a lower bound in a left side of Equation (6). In Equation (7), $d_{min}$ denotes a minimum distance between two points on a constellation of a transmitted symbol, and C denotes a variable for adjusting a range of an interference cancellation criterion. In this case, a value of the C may be changed if necessary. In Equation (7), $h_{j,l}$ denotes the lth column vector included in $\tilde{H}_j$. In this case, l denotes an index for a column vector included in $\tilde{H}_j$. As expressed in Equation (7), sum of norm values of column vectors included in $\tilde{H}_j$ is calculated.

The error prediction scheme criterion as expressed in Equation (7) includes channel information and covariance of noise which the signal receiving apparatus may acquire. So, the signal receiving apparatus may determine whether to use a JML detection scheme using Equation (7) in an actual channel environment.

If a range of an error prediction scheme criterion narrows by applying a variable C which is less than 1 to Equation (7), processing complexity and processing computation amount may be reduced, as described below.

First, the left side of Equation (7) requires an SVD computation which has relatively high complexity. So, in an embodiment of the present disclosure, in order to reduce processing complexity and processing computation amount, the error prediction criterion of Equation (7) may be converted to Equation (8) based on a channel norm value.

$$\min_{m=1,\ldots,N_{RX,i}} \|[\tilde{H}_i]_m\| \frac{d_{min}}{2} < \sum_{j=1,j\neq i}^{N_{user}} \sum_{l}^{N_{RX,j}} \|h_{j,l}\| + \sigma\sqrt{N_{RX,i}} \quad \text{Equation (8)}$$

In Equation (8), σ denotes noise variance of noise, and the σ is a variable which is determined according to a current channel environment. Here, the σ is determined based on a channel environment in the signal receiving apparatus. In Equation (8), m denotes an index for a column vector included in $\tilde{H}_i$. As described in Equation (7), the left side of Equation (7) is converted based on the channel norm value in order to reduce computation complexity due to the SVD computation.

If there is a need to use the JML detection scheme, the signal receiving apparatus performs a signal detecting operation based on a JML detection mode in step 215. In this case, the signal receiving apparatus stops performing the signal detecting operation based on the default interference cancellation mode and performs the signal detecting operation based on the JML detection mode. That is, if the default interference cancellation mode is the JML detection mode, the signal receiving apparatus performs the signal detecting operation based on the JML detection mode, and if the default interference cancellation mode is a normal mode, the signal receiving apparatus stops performing a signal detecting operation based on the normal mode and performs the signal detecting operation based on the JML detection mode.

If there is no need to use the interference cancellation scheme, the signal receiving apparatus performs a signal detecting operation without using the interference cancellation scheme, i.e., the JML detection scheme in step 217. In this case, the signal receiving apparatus stops performing the signal detecting operation based on the default interference cancellation mode and performs the signal detecting operation based on the normal mode. That is, if the default interference cancellation mode is the normal mode, the signal receiving apparatus performs the signal detecting operation based on the normal mode, and if the default interference cancellation mode is the JML detection mode, the signal receiving apparatus stops performing the signal detecting operation based on the JML detection mode and performs the signal detecting operation based on the normal mode.

In FIG. 2, the signal receiving apparatus determines whether to perform the interference cancellation scheme based on the first error prediction scheme while performing the signal detecting operation based on the default interference cancellation mode. In this case, it will be understood by those of ordinary skill in the art that the signal receiving apparatus may determine whether to perform the interference cancellation scheme based on the first error prediction scheme at any time if necessary.

For example, the signal receiving apparatus may determine whether to perform the interference cancellation scheme based on the first error prediction scheme by a preset period, a preset criterion being satisfied, or by considering various parameters.

In this case, a signal transmitting apparatus may notify the signal receiving apparatus of one of the period, the criterion, and the various parameters which triggers the operation of determining whether to perform the interference cancellation scheme based on the first error prediction scheme, or the signal receiving apparatus may set one of the period, the criterion, and the various parameters, where a detailed description of which is omitted.

While FIG. 2 illustrates a process of performing a signal detecting operation based on an AIC scheme in a signal receiving apparatus in a multi-user MIMO communication system according to an embodiment of the present disclosure invention, various changes could be made to FIG. 2. For example, while shown as a series of operations, various operations in FIG. 2 could overlap, occur in parallel, occur in a different order, or occur multiple times.

Figure 3:
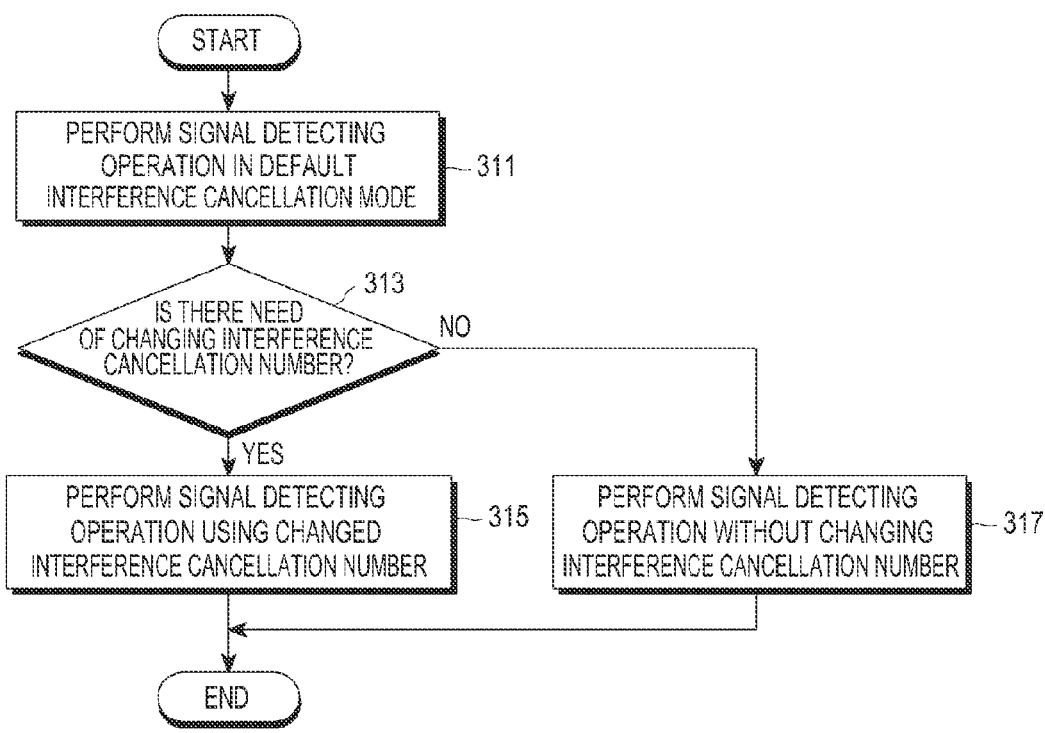
FIG. 3 is a flowchart of a method of performing a signal detecting operation based on an Selective Interference Cancellation (SIC) scheme in a signal receiving apparatus in a multi-user MIMO communication system according to an embodiment of the present disclosure.

A process of performing a signal detecting operation based on an AIC scheme in a signal receiving apparatus in a multi-user MIMO communication system according to an embodiment of the present disclosure is described above with reference to FIG. 2, and a process of performing a signal detecting operation based on a Selective Interference Cancellation (SIC) scheme in a signal receiving apparatus in a multi-user MIMO communication system according to an embodiment of the present disclosure is described below with reference to FIG. 3.

FIG. 3 is a flowchart of a method of performing a signal detecting operation based on an SIC scheme in a signal receiving apparatus in a multi-user MIMO communication system according to an embodiment of the present disclosure.

Referring to FIG. 3, the signal receiving apparatus performs a signal detecting operation based on a default interference cancellation mode as an interference cancellation mode which is set as a default in step 311. In this case, it is assumed that the default interference cancellation mode is a default selective JML (s-JML) detection mode as an s-JML detection mode in which a default interference cancellation number is set. The interference cancellation number denotes the number of interference signals which the signal receiving apparatus will cancel at a related timing point upon performing a signal detecting operation based on a JML detection scheme. The default interference cancellation number denotes the number of interference signals which the signal receiving apparatus will cancel at the related timing point which is set to a default. Here, the default interference cancellation number may be changed to various values if necessary.

While performing the signal detecting operation based on the default interference cancellation mode, i.e., the default s-JML detection mode, the signal receiving apparatus determines whether to change an interference cancellation number which is used in the interference cancellation scheme, i.e., the s-JML detection scheme in step 313. The signal receiving apparatus may determine whether to change the interference cancellation number which is used in the s-JML detection scheme based on the second error prediction scheme, as described below.

In the first error prediction scheme as described in the AIC scheme, the signal receiving apparatus determines whether to use an interference cancellation scheme, i.e., a JML detection scheme. For example, the signal receiving apparatus determines whether to use the JML detection scheme based on Equation (8).

Thus, if Equation (8) is used, the signal receiving apparatus may determine only whether to use the JML detection scheme, and it is difficult for the signal receiving apparatus to determine the number of interference signals which will be canceled at a related timing point upon determining to use the JML detection scheme.

Thus, an embodiment of the present disclosure proposes a new criterion which is used for determining the number of interference signals to cancel if an interference cancellation scheme is used, i.e., the second error prediction scheme, as described below.

The second error prediction scheme which is used for determining an interference cancellation number which is used in the s-JML detection scheme may be performed based on an error prediction scheme criterion as expressed in Equation (9).

$$\|Y_i - \tilde{H}_i X_i - \tilde{H}_{IC} X_{IC,min}\|^2 < \|Y_i - \tilde{H}_i \hat{X}_i - \tilde{H}_{IC} \hat{X}_{IC}\|^2 \quad \text{Equation (9)}$$

In Equation (9), $X_i \neq \hat{X}_i$, $X_{IC}$ denotes a component which the signal receiving apparatus detects within an interference signal, and $X_{NIC}$ denotes a component which the signal receiving apparatus does not detect within the interference signal. In Equation (9), $\tilde{H}_{IC}$ denotes a component which the signal receiving apparatus detects within an interference channel, $\tilde{H}_{NIC}$ denotes a component which the signal receiving apparatus does not detect within the interference channel, and $X_{IC,min}$ denotes an X vector which minimizes the value of the left side of Equation (9). That is, the $X_{IC,min}$ is a variable according to $H_i X_i$ of the left side of Equation (9), and is determined in order to minimize the value of the left side of Equation (9).

That is, Equation (9) indicates a criterion for accurately detecting a transmitted signal if the signal receiving apparatus selects the number of interference signals which will be canceled among a plurality of interference signals, i.e., an interference signal number upon using the s-JML detection scheme. That is, the signal receiving apparatus may detect a transmitted signal without an error only if strength of an interference signal which the signal receiving apparatus may not detect does not affect detection of the transmitted signal. Here, the interference cancellation number is L. If the interference cancellation number L is 0, Equation (9) becomes equal to Equation (7).

Equation (9) may be expressed as Equation (10).

$$\min_{\substack{\hat{X}_i \in \Omega^{N_{Rx,i}}, \\ \hat{X}_i \neq X_i, \\ \hat{X}_{IC} \in \Omega^L}} \left[ \frac{\|\tilde{H}_i(X_i - \hat{X}_i) + \tilde{H}_{IC}(\hat{X}_{IC,min} - \hat{X}_{IC})\|^2}{4} \right] \leq \quad \text{Equation (10)}$$

$$\|\tilde{H}_{NIC} X_{NIC} + N_i\|^2$$

Where, $\Omega^L$ denotes symbol candidate vectors for L interference signals.

Equation (10) denotes a criterion where the signal receiving apparatus may always detect a transmitted signal without an error upon performing a signal detecting operation according to an s-JML detection scheme based on L interference signals. That is, if L is 0 (i.e., L=0) in Equation (10), Equation (10) denotes the same as a criterion as expressed in Equation (6). If L is 0, Equation (10) is equal to Equation (7).

If the signal receiving apparatus detects L interference signals, and an error occurs, the criterion as expressed in Equation (10) is always satisfied, so there is no need for detecting interference signals other than the L interference signals.

In addition, an error prediction scheme criterion as expressed in Equation (10) includes a noise component which a signal transmitting apparatus may not be aware of and transmitted symbol information which the signal transmitting apparatus transmits, thus it may be difficult for the signal receiving apparatus to use the second error prediction scheme which is based on Equation (10).

Thus, if an upper bound and a lower bound are applied to both sides of Equation (10) respectively, Equation (10) may be converted into Equation (11).

$$\frac{\lambda_{min} d_{min}}{2} < \sum_{j=1}^{K-L} |\tilde{h}_{j,NIC}| + \sigma \sqrt{N_{RX,i}} \quad \text{Equation (11)}$$

In Equation (11), K denotes the total number of transmitted streams which $N_{user}$ STAs transmit. For example, if four STAs transmit two transmitted streams, two transmitted streams, and three transmitted streams, respectively, K is 7. In Equation (11), K-L denotes the number of transmitted streams for which an interference detecting operation is not performed among the total transmitted streams, i.e., a magnitude of $X_{NIC}$.

The error prediction scheme criterion as expressed in Equation (11) includes channel information and covariance of noise which the signal receiving apparatus may acquire. So, the signal receiving apparatus may determine the interference cancellation number which is used in the s-JML detection scheme using Equation (11) in an actual channel environment.

If a range of an error prediction scheme criterion narrows by applying a variable C which is less than 1 to Equation (11), processing complexity and processing computation amount may be reduced, as described below.

First, a left side of Equation (11) requires an SVD computation which has relatively high complexity. Thus, in an embodiment of the present disclosure, in order to reduce processing complexity and processing computation amount, the error prediction criterion in Equation (11) may be converted to Equation (12) based on a channel norm value.

$$\min_{m=1,\ldots,N_{RX,i}} \|[\tilde{H}_i]_m\| \frac{d_{min}}{2} < \sum_{j=1}^{K-L} \|\tilde{h}_{j,NIC}\| + \sigma\sqrt{N_{RX,i}} \quad \text{Equation (12)}$$

If the signal receiving apparatus determines to change the interference cancellation number which is used in the s-JML detection scheme, the signal receiving apparatus changes the interference cancellation number which is used in the s-JML detection scheme, and performs a signal detecting operation which is based on an s-JML detection scheme in which the changed interference cancellation number is used in step 315.

If the signal receiving apparatus determines not to change the interference cancellation number which is used in the s-JML detection scheme, the signal receiving apparatus does not change the interference cancellation number which is used in the s-JML detection scheme, and performs a signal detecting operation based on an s-JML detection scheme in which a current interference cancellation number is used in step 317.

In FIG. 3, the signal receiving apparatus determines whether to change the interference cancellation number used in the s-JML detection scheme based on the second error prediction scheme while performing the signal detecting operation based on the s-JML detection scheme in which the default interference cancellation number is used. Here, it will be understood by those of ordinary skill in the art that the signal receiving apparatus may determine whether to change the interference cancellation number used in the s-JML detection scheme based on the second error prediction scheme at any time if necessary.

For example, the signal receiving apparatus may determine whether to change the interference cancellation number used in the s-JML detection scheme based on the second error prediction scheme by a preset period, if a preset criterion is satisfied, or by considering various parameters.

A signal transmitting apparatus may notify the signal receiving apparatus of one of the period, the criterion, and the various parameters which triggers the operation of determining whether to change the interference cancellation number used in the s-JML detection scheme based on the second error prediction scheme, or the signal receiving apparatus may set one of the period, the criterion, and the various parameters, where a detailed description of which is omitted herein.

While FIG. 3 illustrates a process of performing a signal detecting operation based on an SIC scheme in a signal receiving apparatus in a multi-user MIMO communication system according to an embodiment of the present disclosure, various changes could be made to FIG. 3. For example, although shown as a series of operations, various operations in FIG. 3 could overlap, occur in parallel, occur in a different order, or occur multiple times.

A process of performing a signal detecting operation based on an SIC scheme in a signal receiving apparatus in a multi-user MIMO communication system according to an embodiment of the present disclosure is described above with reference to FIG. 3, and a process of determining an interference cancellation number in a signal receiving apparatus in a multi-user MIMO communication system according to an embodiment of the present disclosure is described below with reference to FIG. 4.

Figure 4:
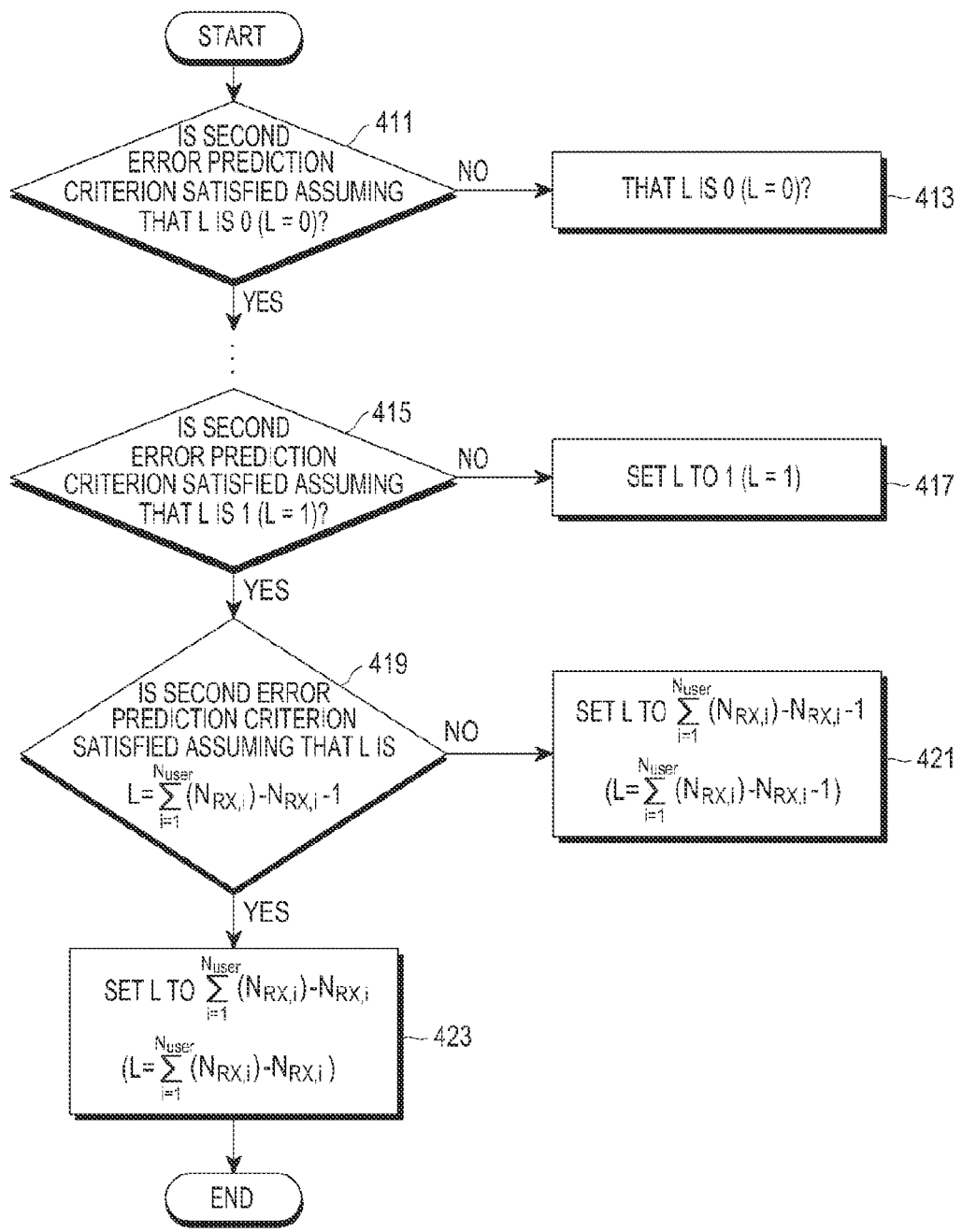
FIG. 4 is a flowchart of a method of determining an interference cancellation number in a signal receiving apparatus in a multi-user MIMO communication system according to an embodiment of the present disclosure.

FIG. 4 is a flowchart of a method of determining an interference cancellation number in a signal receiving apparatus in a multi-user MIMO communication system according to an embodiment of the present disclosure.

Referring to FIG. 4, the signal receiving apparatus determines whether a criterion used in the second error prediction scheme, i.e., the second error prediction criterion, is satisfied assuming that an interference cancellation number L is 0 (i.e., L=0) in step 411. The second error prediction criterion may be one of a criterion of Equation (11) and a criterion of Equation (12).

If the second error prediction criterion is not satisfied assuming that the interference cancellation number L is 0, the signal receiving apparatus sets the interference cancellation number L to 0 (i.e., L=0) in step 413.

If the second error prediction criterion is satisfied assuming that the interference cancellation number L is 0, the signal receiving apparatus determines whether the second error prediction criterion is satisfied assuming that the interference cancellation number L is 1 (i.e., L=1) in step 415.

If the second error prediction criterion is not satisfied assuming that the interference cancellation number L is 1, the signal receiving apparatus sets the interference cancellation number L to 1 (i.e., L=1) in step 417.

If the second error prediction criterion is satisfied assuming that the interference cancellation number L is 1, the signal receiving apparatus determines whether the second error prediction criterion is satisfied assuming that the interference cancellation number L is $$\sum_{i=1}^{N_{user}} (N_{RX,i}) - N_{RX,i} - 1 \left( L = \sum_{i=1}^{N_{user}} (N_{RX,i}) - N_{RX,i} - 1 \right)$$

in step 419. In this case, $$\sum_{i=1}^{N_{user}} (N_{RX,i})$$

is equal to K.

If the second error prediction criterion is not satisfied assuming that the interference cancellation number L is $$\sum_{i=1}^{N_{user}} (N_{RX,i}) - N_{RX,i} - 1,$$

the signal receiving apparatus sets the interference cancellation number L to $$\sum_{i=1}^{N_{user}} (N_{RX,i}) - N_{RX,i} - 1 \left( L = \sum_{i=1}^{N_{user}} (N_{RX,i}) - N_{RX,i} - 1 \right)$$

in step 421.

If the second error prediction criterion is satisfied assuming that the interference cancellation number L is $$\sum_{i=1}^{N_{user}} (N_{RX,i}) - N_{RX,i} - 1,$$

the signal receiving apparatus sets the interference cancellation number L to $$\sum_{i=1}^{N_{user}} (N_{RX,i}) - N_{RX,i} \left( L = \sum_{i=1}^{N_{user}} (N_{RX,i}) - N_{RX,i} \right)$$

in step 423.

While FIG. 4 illustrates a process of determining an interference cancellation number in a signal receiving apparatus in a multi-user MIMO communication system according to an embodiment of the present disclosure, various changes could be made to FIG. 4. For example, although shown as a series of operations, various operations in FIG. 4 could overlap, occur in parallel, occur in a different order, or occur multiple times.

A process of determining an interference cancellation number in a signal receiving apparatus in a multi-user MIMO communication system according to an embodiment of the present disclosure is described above with reference to FIG. 4, and Bit Error Rate (BER) performance in a case where a signal receiving apparatus uses an AIC scheme in a multi-user MIMO communication system according to an embodiment of the present disclosure is described below with reference to FIG. 5.

Figure 5:
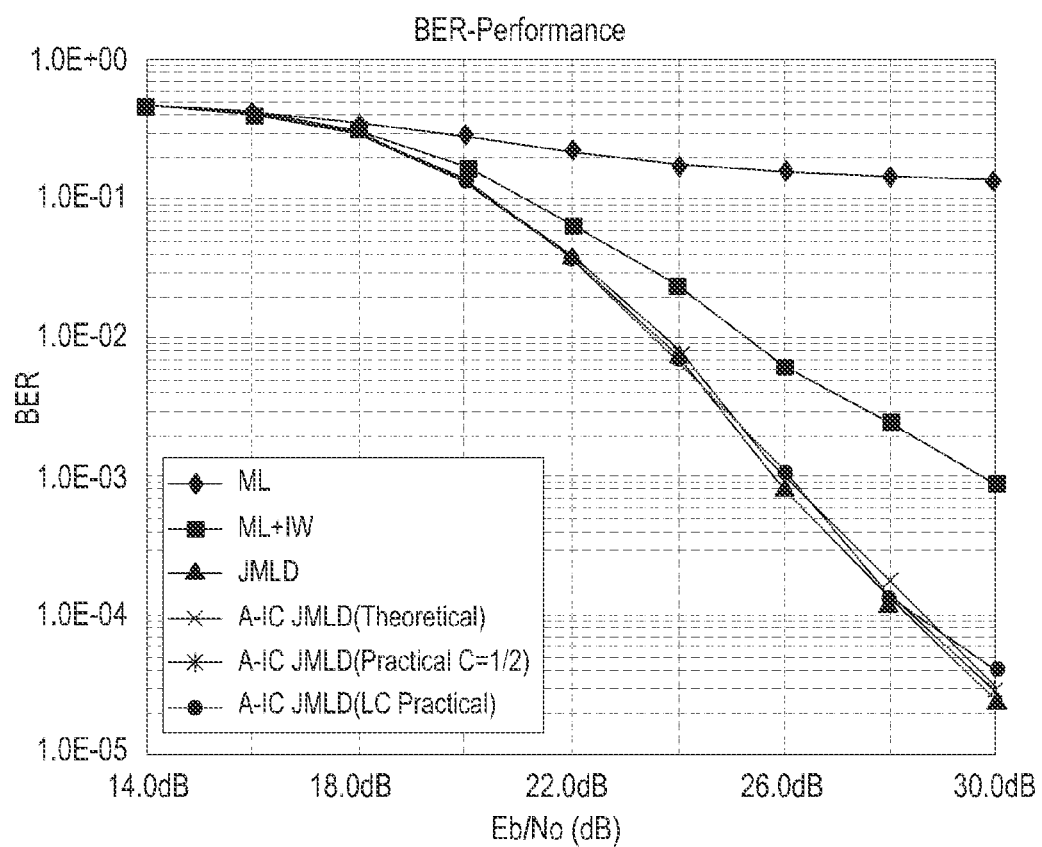
FIG. 5 is a graph that illustrates Bit Error Rate (BER) performance in a case where a signal receiving apparatus uses an AIC scheme in a multi-user MIMO communication system according to an embodiment of the present disclosure.

FIG. 5 is a graph that illustrates BER performance in a case where a signal receiving apparatus uses an AIC scheme in a multi-user MIMO communication system according to an embodiment of the present.

Referring to FIG. 5, a performance graph in FIG. 5 denotes a performance graph in a case where a Modulation and Coding Scheme (MCS) level is 7, a channel estimation scheme is a least square estimation scheme, the number of feedback quantization bits is 5, a subcarrier group size Ng is 2 (i.e., Ng=2), an iteration number is 1000, and a channel model is D in a 4×[2,2] multi-user MIMO system in which the number of signal receiving apparatuses is 2, the number of transmitting antennas is 4, and the number of receiving antennas is 4. For example, it is assumed that the 4×[2,2] multi-user MIMO system is an IEEE 802.11ac communication system, the MCS 7 denotes an MCS level that a 64 phase Quadrature Amplitude Modulation (64QAM) scheme and a 4/5 coding rate are used. The feedback quantization bit denotes a CSI feedback bit, and it is assumed that the CSI feedback bit is a type 3 which is specified in the IEEE 802.11ac communication system. If the CSI feedback bit is type 3, an environment in which an error of pre-coding may be generated is generated. The channel model D is a channel model which is specified in the IEEE 802.11ac communication system, where a detailed description of the channel model D is omitted herein.

The performance graph in FIG. 5 denotes BER performance for each case where a signal receiving apparatus uses an ML detection scheme, a case where the signal receiving apparatus uses an ML plus Interference Whitening (IW) scheme, a case where the signal receiving apparatus uses a JML detection scheme, and a case where the signal receiving apparatus uses an AIC scheme according to an embodiment of the present disclosure.

The BER performance which is acquired in a case where the signal receiving apparatus uses the AIC scheme according to an embodiment of the present disclosure may be classified into BER performance which is acquired based on Equation (6), Equation (7) (e.g. C is ½ (i.e., C=½)), and Equation (8).

In FIG. 5, a performance graph as illustrated by "ML" denotes BER performance which is acquired if the signal receiving apparatus uses the ML detection scheme, a performance graph as illustrated by "ML+IW" denotes BER performance which is acquired if the signal receiving apparatus uses the ML+IW detection scheme, and a performance graph as illustrated by "JMLD" denotes BER performance which is acquired if the signal receiving apparatus uses the JML detection scheme.

In FIG. 5, a performance graph as illustrated by "A-IC JMLD (Theoretical)" denotes BER performance which is acquired based on Equation (6), a performance graph as illustrated by "A-IC JMLD (Practical C=½)" denotes BER performance which is acquired based on Equation (7), and a performance graph as illustrated by "A-IC JMLD (LC Practical)" denotes BER performance which is acquired based on Equation (8).

In FIG. 5, a vertical axis denotes a BER, and a horizontal axis denotes an Energy per bit to NOise power spectral density ratio (Eb/NO).

As illustrated in FIG. 5, it will be understood that BER performance which is almost similar to JML detection performance may be acquired if a signal receiving apparatus uses an AIC scheme according to an embodiment of the present disclosure.

BER performance in a case where a signal receiving apparatus uses an AIC scheme in a multi-user MIMO communication system according to an embodiment of the present disclosure is described above with reference to FIG. 5, and estimation error rate performance in a case where a signal receiving apparatus uses an AIC scheme in a multi-user MIMO communication system according to an embodiment of the present disclosure is described below with reference to FIG. 6.

Figure 6:
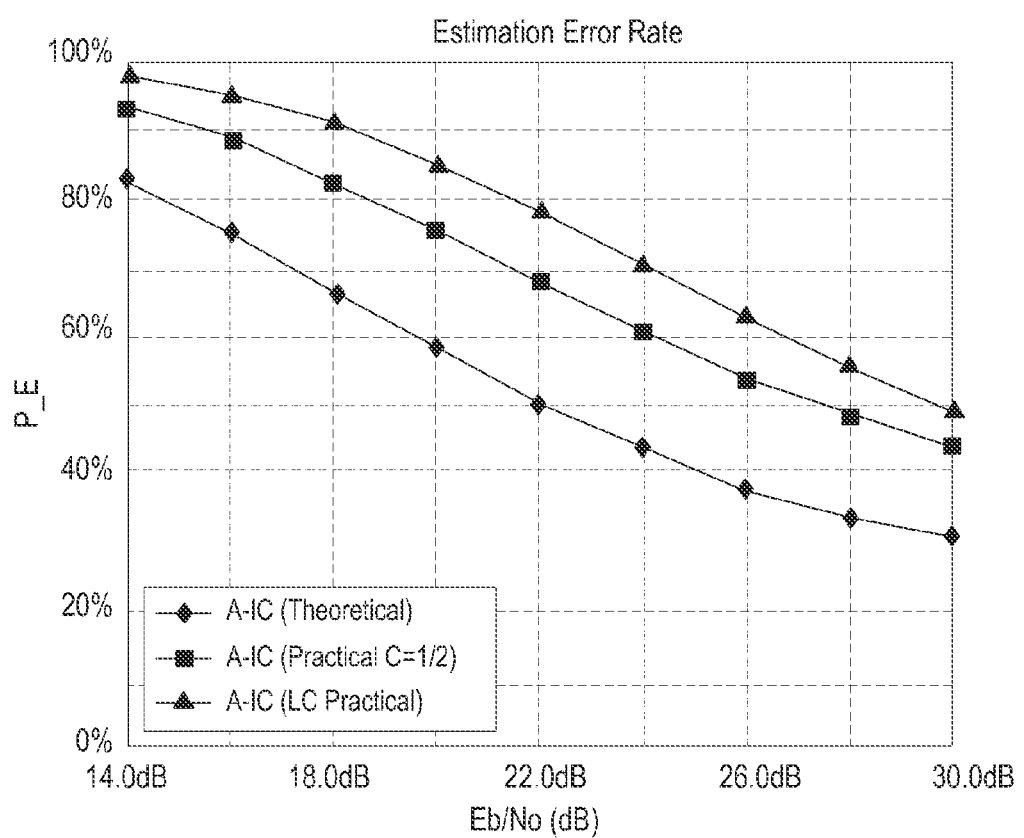
FIG. 6 is a graph that illustrates Estimation Error Rate performance in a case where a signal receiving apparatus uses an AIC scheme in a multi-user MIMO communication system according to an embodiment of the present disclosure.

FIG. 6 is a graph that illustrates estimation error rate performance in a case where a signal receiving apparatus uses an AIC scheme in a multi-user MIMO communication system according to an embodiment of the present disclosure.

Referring to FIG. 6, a performance graph in FIG. 6 denotes a performance graph in a case where an MCS level is 7, a channel estimation scheme is a least square estimation scheme, the number of feedback quantization bits is 5, a subcarrier group size Ng is 2 (i.e., Ng=2), an iteration number is 1000, and a channel model is D in a 4×[2,2] multi-user MIMO system in which the number of signal receiving apparatuses is 2, the number of transmitting antennas is 4, and the number of receiving antennas is 4. For example, it is assumed that the 4×[2,2] multi-user MIMO system is an IEEE 802.11ac communication system. The feedback quantization bit denotes a CSI feedback bit, and it is assumed that the CSI feedback bit is type 3 as specified in the IEEE 802.11ac communication system. If the CSI feedback bit is type 3, an environment in which an error of pre-coding may be generated is generated. The channel model D is a channel model which is specified in the IEEE 802.11ac communication system, where a detailed description of the channel model D is omitted herein.

An estimation error rate performance graph which a signal receiving apparatus acquires based on Equation (6), i.e., a theoretical estimation error rate performance graph, Equation (7) (C is ½ (i.e., C=½)), and Equation (8) are illustrated in FIG. 6.

In FIG. 6, a performance graph as illustrated by "A-IC (Theoretical)" denotes an estimation error rate which is acquired based on Equation (6), a performance graph as illustrated by "A-IC (Practical C=½)" denotes an estimation error rate which is acquired based on Equation (7), and a performance graph as illustrated by "A-IC (LC Practical)" denotes an estimation error rate which is acquired based on Equation (8).

The estimation error rate performance graph in FIG. 6 indicates an estimation error rate as a rate where the signal receiving apparatus estimates a specific symbol among the total symbols as an error.

In FIG. 6, a horizontal axis denotes an Eb/N0, and a vertical axis denotes a probability P_E of a symbol which is estimated as an error among the total symbols. That is, the P_E is interpreted as a ratio of total symbols to symbols to which an interference cancellation scheme is applied. Thus, it will be understood that a performance graph as illustrated by "A-IC (Theoretical)" indicates the lowest estimation error rate, a performance graph as illustrated by "A-IC (Practical C=½)" indicates the next lower estimation error rate, and a performance graph as illustrated by "A-IC (LC Practical)" indicates the highest estimation error rate.

More particularly, as illustrated in FIG. 6, it will be understood that an AIC scheme according to an embodiment of the present disclosure may decrease the detection number for an interference signal by up to about 50% according to an Eb/N0.

Estimation error rate performance in a case where a signal receiving apparatus uses an AIC scheme in a multi-user MIMO communication system according to an embodiment of the present disclosure has been described with reference to FIG. 6, and BER performance in a case where a signal receiving apparatus uses an SIC scheme in a multi-user MIMO communication system according to an embodiment of the present disclosure is described below with reference to FIG. 7.

Figure 7:
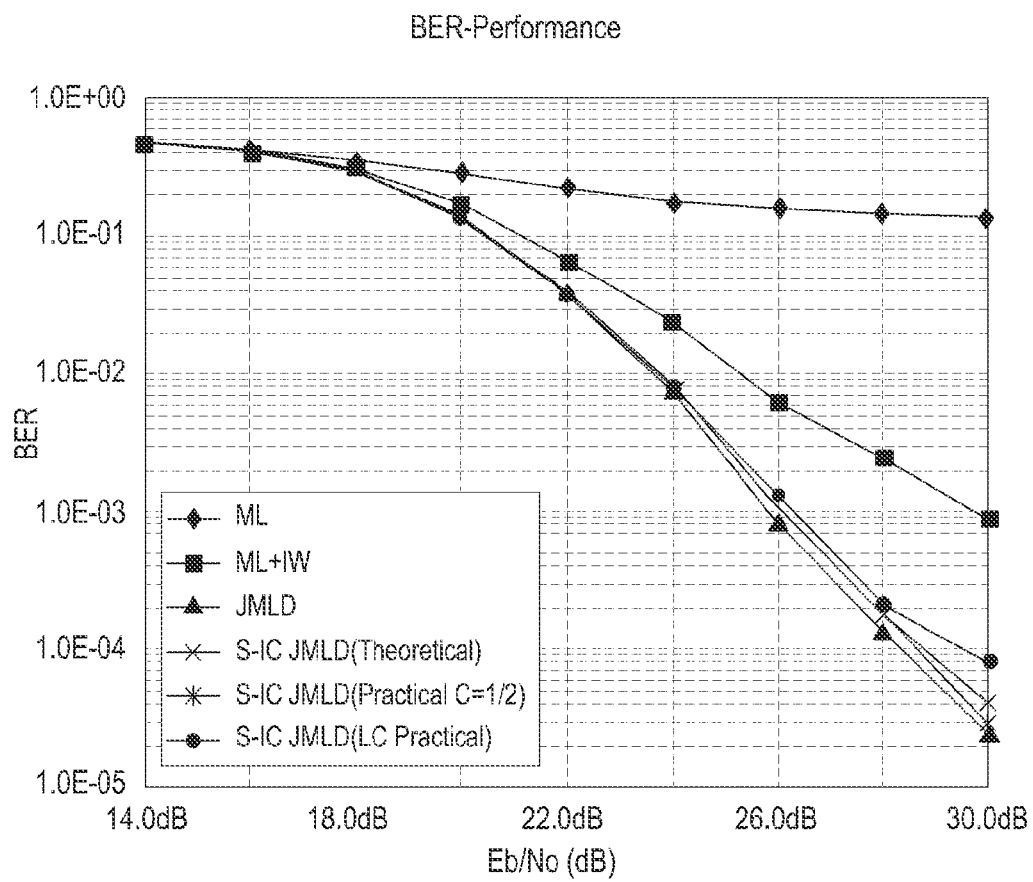
FIG. 7 is a graph illustrates BER performance in a case where a signal receiving apparatus uses an SIC scheme in a multi-user MIMO communication system according to an embodiment of the present disclosure.

FIG. 7 is a graph that illustrates BER performance in a case where a signal receiving apparatus uses an SIC scheme in a multi-user MIMO communication system according to an embodiment of the present disclosure.

Referring to FIG. 7, a performance graph in FIG. 7 denotes a performance graph in a case where an MCS level is 7, a channel estimation scheme is a least square estimation scheme, the number of feedback quantization bits is 5, a subcarrier group size Ng is 2 (i.e., Ng=2), an iteration number is 1000, and a channel model is D in a 4×[2,2] multi-user MIMO system in which the number of signal receiving apparatuses is 2, the number of transmitting antennas is 4, and the number of receiving antennas is 4. For example, it is assumed that the 4×[2,2] multi-user MIMO system is an IEEE 802.11ac communication system. The feedback quantization bit denotes a CSI feedback bit, and it is assumed that the CSI feedback bit is type 3 as specified in the IEEE 802.11ac communication system. If the CSI feedback bit is type 3, an environment in which an error of pre-coding may be generated is generated. The channel model D is a channel model which is specified in the IEEE 802.11ac communication system, where a detailed description of the channel model D is omitted herein.

A performance graph in FIG. 7 denotes BER performance for each case where a signal receiving apparatus uses an ML detection scheme, a case where the signal receiving apparatus uses an ML+IW scheme, a case where the signal receiving apparatus uses a JML detection scheme, and a case where the signal receiving apparatus uses an SIC scheme according to an embodiment of the present disclosure.

The BER performance which is acquired in a case where the signal receiving apparatus uses the SIC scheme according to an embodiment of the present disclosure may be classified into BER performance which is acquired based on Equation (10), Equation (11) (C is ½ (i.e., C=½)), and Equation (12).

In FIG. 7, a performance graph as illustrated by "ML" denotes BER performance which is acquired if the signal receiving apparatus uses the ML detection scheme, a performance graph as illustrated by "ML+IW" denotes BER performance which is acquired if the signal receiving apparatus uses the ML+IW detection scheme, and a performance graph as illustrated by "JMLD" denotes BER performance which is acquired if the signal receiving apparatus uses the JML detection scheme.

In FIG. 7, a performance graph as illustrated by "S-IC JMLD (Theoretical)" denotes BER performance which is acquired based on Equation (10), a performance graph as illustrated by "S-IC JMLD (Practical C=½)" denotes BER performance which is acquired based on Equation (11), and a performance graph as illustrated by "S-IC JMLD (LC Practical)" denotes BER performance which is acquired based on Equation (12).

In FIG. 7, a vertical axis denotes a BER, and a horizontal axis denotes an Eb/N0.

As illustrated in FIG. 7, it will be understood that BER performance which is almost similar to JML detection performance may be acquired if a signal receiving apparatus uses an SIC scheme according to an embodiment of the present disclosure.

BER performance in a case where a signal receiving apparatus uses an SIC scheme in a multi-user MIMO communication system according to an embodiment of the present disclosure is described above with reference to FIG. 7, and estimation error performance in a case where a signal receiving apparatus uses an SIC scheme in a multi-user MIMO communication system according to an embodiment of the present disclosure is described below with reference to FIG. 8.

Figure 8:
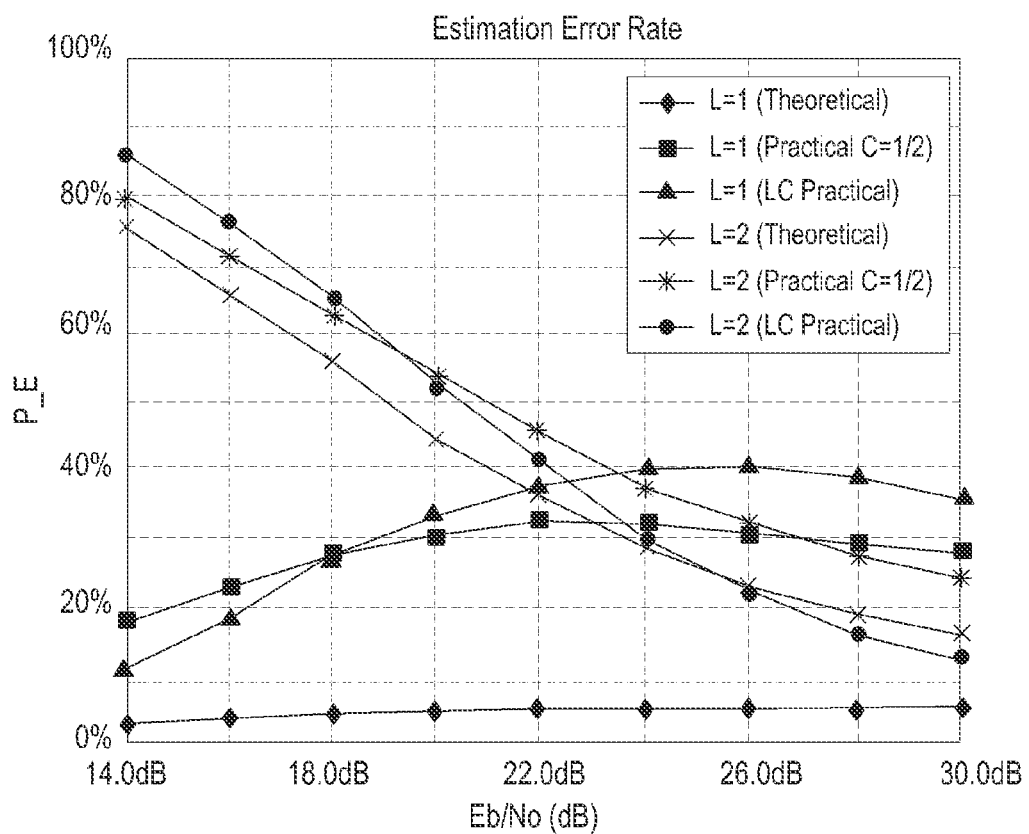
FIG. 8 is a graph that illustrates Estimation Error Performance in a case where a signal receiving apparatus uses an SIC scheme in a multi-user MIMO communication system according to an embodiment of the present disclosure.

FIG. 8 is a graph that illustrates estimation error performance in a case where a signal receiving apparatus uses an SIC scheme in a multi-user MIMO communication system according to an embodiment of the present disclosure.

Referring to FIG. 8, a performance graph in FIG. 8 denotes a performance graph in a case where an MCS level is 7, a channel estimation scheme is a least square estimation scheme, the number of feedback quantization bits is 5, a subcarrier group size Ng is 2 (i.e., Ng=2), an iteration number is 1000, and a channel model is D in a 4×[2,2] multi-user MIMO system in which the number of signal receiving apparatus is 2, the number of transmitting antennas is 4, and the number of receiving antennas is 4. For example, it is assumed that the 4×[2,2] multi-user MIMO system is an IEEE 802.11ac communication system. The feedback quantization bit denotes a CSI feedback bit, and it is assumed that the CSI feedback bit is type 3 as specified in the IEEE 802.11ac communication system. If the CSI feedback bit is type 3, an environment in which an error of pre-coding may be generated is generated. The channel model D is a channel model which is specified in the IEEE 802.11 ac communication system, where a detailed description of the channel model D is omitted herein.

An estimation error rate performance graph which a signal receiving apparatus acquires based on Equation (10), i.e., a theoretical estimation error rate performance graph, Equation (11) (C is ½ (i.e., C=½)), and Equation (12) in a case where an interference cancellation number L is set to 1 (i.e., L=1) are illustrated in FIG. 8. Further, an estimation error rate performance graph which a signal receiving apparatus acquires based on Equation (10), i.e., a theoretical estimation error rate performance graph, Equation (11) (C is ½ (i.e., C=½)), and Equation (12) in a case where the interference cancellation number L is set to 2 (i.e., L=2) are illustrated in FIG. 8.

In FIG. 8, a performance graph as illustrated by "L=1 (Theoretical)" denotes an estimation error rate which is acquired based on Equation (10) if L is set to 1, a performance graph as illustrated by "L=1 (Practical C=½)" denotes an estimation error rate which is acquired based on Equation (11) if L is set to 1, and a performance graph as illustrated by "L=1 (LC Practical)" denotes an estimation error rate which is acquired based on Equation (12) if L is set to 1.

In FIG. 8, a performance graph as illustrated by "L=2 (Theoretical)" denotes an estimation error rate which is acquired based on Equation (10) if L is set to 2, a performance graph as illustrated by "L=2 (Practical C=½)" denotes an estimation error rate which is acquired based on Equation (11) if L is set to 2, and a performance graph as illustrated by "L=2 (LC Practical)" denotes an estimation error rate which is acquired based on Equation (12) if L is set to 2.

The estimation error rate performance graph in FIG. 8 indicates an estimation error rate as a rate where the signal receiving apparatus estimates a specific symbol among the total symbols as an error.

In FIG. 8, a horizontal axis denotes an Eb/N0, and a vertical axis denotes a probability P_E that interference signals are canceled from L symbols among the total symbols. That is, the P_E may be interpreted as a ratio of total symbols to symbols to which an interference cancellation scheme is applied.

In FIG. 8, in a case where L is 2, if an Eb/N0 increases, a P_E decreases, and, in a case where L is 1, if an Eb/N0 increases, a P_E slightly increases. When a signal detecting operation is performed based on Equations (11) and (12), it will be understood that the P_E is about 40% if the L is 1, and the P_E is about 15% if the L is 2 on 28 dB basis. That is, it will be understood that an interference cancellation scheme is not used for 45% of total symbols, an interference cancellation scheme in which L is 1 is used for 40% of the total symbols, and an interference cancellation scheme in which L is 2 is used for 15% of the total symbols.

As described in FIG. 8, a signal receiving apparatus uses an interference cancellation scheme only if the interference cancellation scheme is required thereby decreasing processing complexity and processing computation amount which are necessary for detecting a signal, as described below with reference to Table 1.

TABLE 1

| Number of Multiplications | JMLD (L = 2) | A-IC JMLD | S-IC JMLD |
|---|---|---|---|
| Error Estimation Complexity | 0 | 16 | 16 |
| Calculation of EDs | 65536 × 4 | 37888 × 4 | 18719 × 4 |
| Total | 262144 (100%) | 151552 (58%) | 74876 (29%) |

In Table 1, A-IC JMLD denotes an AIC scheme according to an embodiment of the present disclosure, S-IC JMLD denotes an SIC scheme according to an embodiment of the present disclosure, and JMLD (L=2) denotes a normal JMLD scheme in which the number of interference signals which are canceled is 2. It will be understood that a scheme as described in FIG. 8 has processing complexity and processing computation amount in Table 1 similar to a JMLD scheme on an MCS 7 basis.

The processing complexity and the processing computation amount in Table 1 are indicated based on the number of multiplications performed in each of the JML detection scheme, the AIC scheme, and the SIC scheme. As described in Table 1, it will be understood that the number of multiplications performed when the AIC scheme and the SIC scheme are used may decrease up to about 42% and 71%, respectively, as compared to the number of multiplications performed when the JML detection scheme is used.

Estimation error performance in a case where a signal receiving apparatus uses an SIC scheme in a multi-user MIMO communication system according to an embodiment of the present disclosure is described above with reference to FIG. 8, and an inner structure of a signal transmitting apparatus in a multi-user MIMO communication system according to an embodiment of the present disclosure is described below with reference to FIG. 9.

Figure 9:
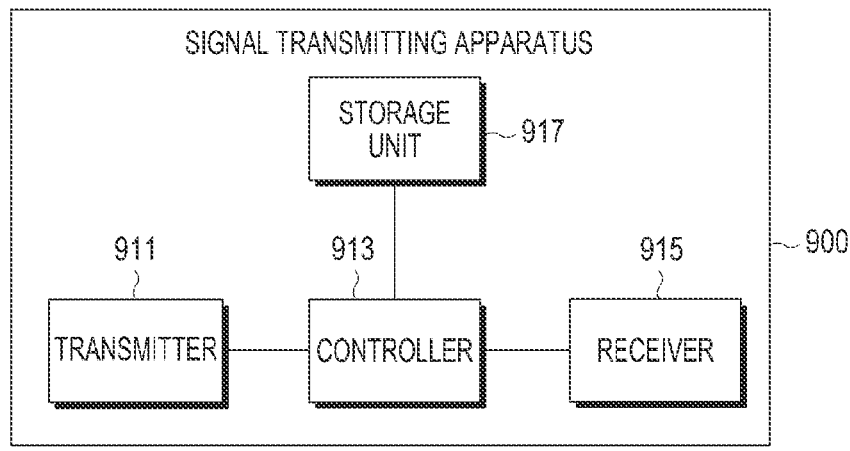
FIG. 9 is a block diagram of a signal transmitting apparatus in a multi-user MIMO communication system according to an embodiment of the present disclosure.

FIG. 9 is a block diagram of a signal transmitting apparatus 900 in a multi-user MIMO communication system according to an embodiment of the present disclosure.

Referring to FIG. 9, the signal transmitting apparatus 900 includes a transmitter 911, a controller 913, a receiver 915, and a storage unit 917.

The controller 913 controls the overall operation of the signal transmitting apparatus 900. More particularly, the controller 913 controls the signal transmitting apparatus 900 to perform a signal detecting operation according to an embodiment of the present disclosure, i.e., an operation related to a signal detecting operation which is based on an AIC scheme and an SIC scheme. The operation related to the signal detecting operation which is based on the AIC scheme and the SIC scheme is performed in the manner described with reference to FIGS. 1 to 8, where a description thereof is omitted herein.

The transmitter 911 transmits various signals, messages, and the like to a signal receiving apparatus, and the like under control of the controller 913. The various signals, messages, and the like transmitted by the transmitter 911 are described above in FIGS. 1 to 8, where a description thereof is omitted herein.

The receiver 915 receives various signals, messages, and the like from a signal receiving apparatus, and the like under control of the controller 913. The various signals, messages, and the like received by the receiver 915 are described above in FIGS. 1 to 8, where a description thereof is omitted herein.

The storage unit 917 stores various data necessary for the operation of the signal transmitting apparatus 900, information related to the operation related to the signal detecting operation which is based on the AIC scheme and the SIC scheme, and the like. The storage unit 917 stores the various signals, messages, and the like received in the receiver 915.

While the transmitter 911, the controller 913, the receiver 915, and the storage unit 917 are described as separate processors, it is to be understood that this is merely for convenience of description. In other words, two or more of the transmitter 911, the controller 913, the receiver 915, and the storage unit 917 may be incorporated into a single processor.

An inner structure of a signal transmitting apparatus 900 in a multi-user MIMO communication system according to an embodiment of the present disclosure is described above with reference to FIG. 9, and an inner structure of a signal receiving apparatus in a multi-user MIMO communication system according to an embodiment of the present disclosure is described below with reference to FIG. 10.

Figure 10:
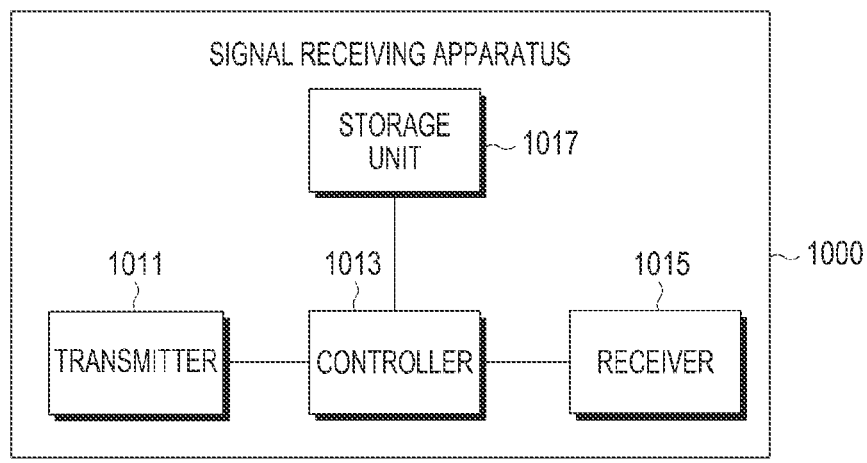
FIG. 10 is a block diagram of a signal receiving apparatus in a multi-user MIMO communication system according to an embodiment of the present disclosure.

FIG. 10 is a block diagram of a signal receiving apparatus 1000 in a multi-user MIMO communication system according to an embodiment of the present disclosure.

Referring to FIG. 10, the signal receiving apparatus 1000 includes a transmitter 1011, a controller 1013, a receiver 1015, and a storage unit 1017.

The controller 1013 controls the overall operation of the signal receiving apparatus 1000. More particularly, the controller 1013 controls the signal receiving apparatus 1000 to perform a signal detecting operation according to an embodiment of the present disclosure, i.e., an operation related to a signal detecting operation which is based on an AIC scheme and an SIC scheme. The operation related to the signal detecting operation which is based on the AIC scheme and the SIC scheme is performed in the manner described with reference to FIGS. 1 to 8; therefore a description thereof is omitted herein.

The transmitter 1011 transmits various signals, messages, and the like to a signal transmitting apparatus, and the like under control of the controller 1013. The various signals, messages, and the like transmitted in the transmitter 1011 are described above in FIGS. 1 to 8; therefore a description thereof is omitted herein.

The receiver 1015 receives various signals, messages, and the like from a signal transmitting apparatus, and the like under control of the controller 1013. The various signals, messages, and the like received in the receiver 1015 are described above in FIGS. 1 to 8; therefore a description thereof is omitted herein.

The storage unit 1017 stores various data necessary for the operation of the signal receiving apparatus 1000, information related to the operation related to the signal detecting operation which is based on the AIC scheme and the SIC scheme, and the like. The storage unit 1017 stores the various signals, messages, and the like received by the receiver 1015.

While the transmitter 1011, the controller 1013, the receiver 1015, and the storage unit 1017 are described as separate processors, it is to be understood that this is merely for convenience of description. In other words, two or more of the transmitter 1011, the controller 1013, the receiver 1015, and the storage unit 1017 may be incorporated into a single processor.

As is apparent from the foregoing description, an embodiment of the present disclosure enables cancellation of interference in a communication system supporting a multi-user MIMO scheme.

An embodiment of the present disclosure enables adaptive cancellation of interference based on an error prediction scheme in a communication system supporting a multi-user MIMO scheme.

An embodiment of the present disclosure enables cancellation of interference thereby decreasing processing complexity in a communication system supporting a multi-user MIMO scheme.

An embodiment of the present disclosure enables cancellation of interference thereby decreasing processing computation amount in a communication system supporting a multi-user MIMO scheme.

An embodiment of the present disclosure enables cancellation of interference thereby decreasing power consumption in a communication system supporting a multi-user MIMO scheme.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include Read Only Memory (ROM), Random Access Memory (RAM), Compact Disk ROMs (CD-ROMs), magnetic tapes, floppy disks, optical data storage devices, and carrier waves (such as data transmission via the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory Integrated Circuit (IC), or an optically or magnetically recordable non-transitory machine-readable (e.g., computer-readable), storage medium (e.g., a Compact Disk (CD), a Digital Versatile Disk (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted via wired and/or wireless connections, and the present disclosure may include their equivalents.

An apparatus according to an embodiment of the present disclosure may receive the program from a program providing device which is connected to the apparatus via a wire or a wireless connection and store the program. The program providing device may include a memory for storing instructions which instruct the performance of a content protect method which is installed, information necessary for the content protect method, and the like, a communication unit for performing a wired or a wireless communication with a graphics processing device, and a controller for transmitting a related program to a transmitting/receiving device based on a request of the graphics processing device or automatically transmitting the related program to the transmitting/receiving device.

While the present disclosure has been shown and described with reference to various embodiments thereof, it will be understood by those skilled in the art that various changes in form and details may be made therein without departing from the scope and spirit of the present disclosure as defined by the appended claims and their equivalents.

What is claimed is:

1. A method of canceling interference by a signal receiving apparatus in a communication system supporting a multi-user Multiple-Input Multiple-Output (MIMO) scheme, the method comprising:
determining, while performing a signal detecting operation, that an error prediction scheme criterion is satisfied by an error of a transmitted signal, which is detected without considering an interference signal, being less than an error of a transmitted signal, which is detected by considering the interference signal: and
performing the signal detecting operation using the interference cancellation scheme, in response to determining that the error prediction scheme criterion is satisfied,
wherein the error of the transmitted signal, which is detected without considering the interference signal, is determined based one of:
an estimated pre-coding matrix, a channel matrix, a symbol vector that is transmitted from a signal transmitting apparatus, and a received signal,
the estimated pre-coding matrix, the channel matrix, the symbol vector that is transmitted from the signal transmitting apparatus, and an estimated transmitted symbol vector,
a Singular Value Decomposition (SVD) value of the channel matrix and a minimum distance between two points on a constellation of a transmitted symbol, and
the channel matrix and the minimum distance between the two points on the constellation of the transmitted symbol.

2. The method of claim 1, wherein the error prediction scheme criterion is determined based on the estimated pre-coding matrix, the channel matrix, the symbol vector that is transmitted from the signal transmitting apparatus, and the received signal.

3. The method of claim 1, wherein the error prediction scheme criterion is determined based on the estimated pre-coding matrix, the channel matrix, the symbol vector that is transmitted from the signal transmitting apparatus, the estimated transmitted symbol vector, and a noise.

4. The method of claim 1, wherein the error prediction scheme criterion is determined based on the SVD value of the channel matrix, the minimum distance between the two points on the constellation of the transmitted symbol, the channel matrix, and a noise.

5. The method of claim 1, wherein the error prediction scheme criterion is determined based on the channel matrix, the minimum distance between the two points on the constellation of the transmitted symbol, and a noise.

6. A signal receiving apparatus in a communication system supporting a multi-user Multiple-Input Multiple-Output (M IMO) scheme, the signal receiving apparatus comprising:
a receiver; and
a controller configured to:
determine, while performing a signal detecting operation, that an error prediction scheme criterion is satisfied by an error of a transmitted signal, which is detected without considering an interference signal, being less than an error of a transmitted signal, which is detected by considering the interference signal; and
perform the signal detecting operation using the interference cancellation scheme in response to determining that the error prediction scheme criterion is satisfied,
wherein the error of the transmitted signal, which is detected without considering the interference signal, is determined based one of:
an estimated pre-coding matrix, a channel matrix, a symbol vector that is transmitted from a signal transmitting apparatus, and a received signal,
the estimated pre-coding matrix, the channel matrix, the symbol vector that is transmitted from the signal transmitting apparatus, and an estimated transmitted symbol vector,
a Singular Value Decomposition (SVD) value of the channel matrix and a minimum distance between two points on a constellation of a transmitted symbol, and
the channel matrix and the minimum distance between the two points on the constellation of the transmitted symbol.

7. The signal receiving apparatus of claim 6, wherein the error prediction scheme criterion is determined based on the estimated pre-coding matrix, the channel matrix, the symbol vector that is transmitted from the signal transmitting apparatus, and the received signal.

8. The signal receiving apparatus of claim 6, wherein the error prediction scheme criterion is determined based on the estimated pre-coding matrix, the channel matrix, the symbol vector that is transmitted from the signal transmitting apparatus, the estimated transmitted symbol vector, and a noise.

9. The signal receiving apparatus of claim 6, wherein the error prediction scheme criterion is determined based on the SVD value of the channel matrix, the minimum distance between the two points on the a constellation of the transmitted symbol, the channel matrix, and a noise.

10. The signal receiving apparatus of claim 6, wherein the error prediction scheme criterion is determined based on the channel matrix, the minimum distance between the two points on the constellation of the transmitted symbol, and a noise.

* * * * *